US008401705B2

(12) United States Patent
Alexanian

(10) Patent No.: US 8,401,705 B2
(45) Date of Patent: *Mar. 19, 2013

(54) IRRIGATION CONTROLLER WATER MANAGEMENT WITH TEMPERATURE BUDGETING

(76) Inventor: George Alexanian, Fresno, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/274,255

(22) Filed: Oct. 14, 2011

(65) Prior Publication Data

US 2012/0072037 A1    Mar. 22, 2012

Related U.S. Application Data

(63) Continuation of application No. 12/955,839, filed on Nov. 29, 2010, which is a continuation-in-part of application No. 11/879,700, filed on Jul. 17, 2007, now Pat. No. 7,844,368, which is a continuation-in-part of application No. 11/336,690, filed on Jan. 20, (Continued)

(51) Int. Cl.
*G05D 11/00* (2006.01)
*A01G 25/00* (2006.01)
(52) U.S. Cl. ......................................... 700/284; 239/69
(58) Field of Classification Search .................. 700/284; 239/67–70, 723; 137/78.1–78.3, 624.11–624.15, 137/624.21; 405/36, 37
See application file for complete search history.

(56) References Cited

U.S. PATENT DOCUMENTS

| 3,114,243 A | 12/1963 | Winters |
| 3,372,899 A | 3/1968 | McPhearson |
| 3,653,595 A | 4/1972 | Greengard et al. |
| 3,726,477 A | 4/1973 | Shapiro |
| 3,787,728 A | 1/1974 | Bayer et al. |
| 3,902,825 A | 9/1975 | Quillen |
| 4,010,898 A | 3/1977 | Williams |
| 4,146,049 A | 3/1979 | Kruse et al. |
| 4,176,395 A | 11/1979 | Evelyn-Veere |
| 4,185,650 A | 1/1980 | Neves et al. |
| 4,208,630 A | 6/1980 | Martinez |
| 4,209,131 A | 6/1980 | Barash et al. |
| 4,265,403 A * | 5/1981 | Bonetti ........................ 239/66 |
| 4,333,490 A | 6/1982 | Enter, Sr. |
| RE31,023 E | 9/1982 | Hall, III |
| 4,396,149 A | 8/1983 | Hirsch |
| 4,396,150 A | 8/1983 | Burrough |
| 4,431,338 A | 2/1984 | Hornabrook |
| 4,502,288 A | 3/1985 | Lynch |
| 4,526,034 A | 7/1985 | Campbell et al. |
| 4,545,396 A | 10/1985 | Miller et al. |
| 4,548,225 A | 10/1985 | Busalacchi |

(Continued)

OTHER PUBLICATIONS

"Report on Performance of ET Based Irrigation Controller—Analysis of Operation of WeatherTRAK (TM) Controller in Field Conditions During 2002," Aquacraft, Inc., Apr. 23, 2003.*

(Continued)

*Primary Examiner* — M.N. Von Buhr
(74) *Attorney, Agent, or Firm* — Mark D. Miller

(57) ABSTRACT

The present invention provides methods for water conservation with irrigation controllers based upon the ambient temperature and extraterrestrial radiation of a particular geographical area. It receives a preliminary irrigation schedule from the operator and computes a water budget ratio by comparing current local geo-environmental data with stored local geo-environmental data, then modifying the preliminary irrigation schedule based upon that ratio. The present invention utilizes fewer variables, is less complex, and is much easier to install and maintain than the current evapotranspiration-based controllers.

16 Claims, 9 Drawing Sheets

Related U.S. Application Data 2006, now Pat. No. 7,266,428, which is a continuation-in-part of application No. 10/824,667, filed on Apr. 13, 2004, now Pat. No. 7,058,478.

(60) Provisional application No. 60/465,457, filed on Apr. 25, 2003.

(56) References Cited

U.S. PATENT DOCUMENTS

| | | | |
|---|---|---|---|
| 4,569,020 A | 2/1986 | Snoddy et al. | |
| 4,575,004 A * | 3/1986 | Geiger | 239/69 |
| 4,613,077 A * | 9/1986 | Aronson | 239/97 |
| 4,613,764 A | 9/1986 | Lobato | |
| 4,626,984 A | 12/1986 | Unruh et al. | |
| 4,646,224 A | 2/1987 | Ransburg et al. | |
| 4,684,920 A | 8/1987 | Reiter | |
| 4,691,341 A | 9/1987 | Knoble et al. | |
| 4,709,585 A | 12/1987 | Altenhofen | |
| 4,755,942 A | 7/1988 | Gardner et al. | |
| 4,789,097 A | 12/1988 | Anderson et al. | |
| 4,837,499 A | 6/1989 | Sherer, III | |
| 4,852,802 A | 8/1989 | Iggulden et al. | |
| 4,856,227 A | 8/1989 | Oglevee et al. | |
| 4,858,377 A | 8/1989 | Oglevee et al. | |
| 4,876,647 A | 10/1989 | Gardner et al. | |
| 4,913,351 A * | 4/1990 | Costa | 239/74 |
| 4,921,001 A | 5/1990 | Pittsinger | |
| 4,922,433 A | 5/1990 | Mark | |
| 4,934,400 A | 6/1990 | Cuming | |
| 4,952,868 A | 8/1990 | Scherer, III | |
| 4,962,522 A | 10/1990 | Marian | |
| 4,967,789 A | 11/1990 | Kypris | |
| 4,992,942 A | 2/1991 | Bauerlie et al. | |
| 5,023,787 A | 6/1991 | Evelyn-Veere | |
| 5,097,861 A | 3/1992 | Hopkins et al. | |
| 5,101,083 A | 3/1992 | Tyler et al. | |
| 5,121,340 A | 6/1992 | Campbell et al. | |
| 5,148,826 A | 9/1992 | Bakhshaei | |
| 5,208,855 A | 5/1993 | Marian | |
| 5,229,937 A | 7/1993 | Evelyn-Veere | |
| 5,244,177 A | 9/1993 | Campbell et al. | |
| 5,251,153 A * | 10/1993 | Nielsen et al. | 700/284 |
| 5,321,578 A | 6/1994 | Morrison et al. | |
| 5,341,831 A | 8/1994 | Zur | |
| 5,355,122 A | 10/1994 | Erickson | |
| 5,375,617 A | 12/1994 | Young | |
| 5,444,611 A | 8/1995 | Woytowitz et al. | |
| 5,445,176 A | 8/1995 | Goff | |
| 5,465,904 A | 11/1995 | Vaello | |
| 5,479,338 A | 12/1995 | Ericksen et al. | |
| 5,479,339 A | 12/1995 | Miller | |
| 5,638,847 A | 6/1997 | Hock, Jr. et al. | |
| 5,696,671 A | 12/1997 | Oliver | |
| 5,836,339 A | 11/1998 | Klever et al. | |
| 5,839,660 A | 11/1998 | Morganstern et al. | |
| 5,853,122 A | 12/1998 | Caprio | |
| 5,870,302 A | 2/1999 | Oliver | |
| 5,908,157 A | 6/1999 | Antonellis et al. | |
| 5,921,280 A | 7/1999 | Ericksen et al. | |
| 5,960,813 A | 10/1999 | Sturman et al. | |
| 6,076,740 A | 6/2000 | Townsend | |
| 6,088,621 A | 7/2000 | Woytowitz et al. | |
| 6,098,898 A | 8/2000 | Storch | |
| 6,102,061 A | 8/2000 | Addink | |
| 6,145,755 A | 11/2000 | Feltz | |
| 6,173,727 B1 * | 1/2001 | Davey | 137/1 |
| 6,227,220 B1 | 5/2001 | Addink | |
| 6,250,091 B1 | 6/2001 | Jerome | |
| 6,259,955 B1 | 7/2001 | Brundisini et al. | |
| 6,267,298 B1 | 7/2001 | Campbell | |
| 6,298,285 B1 | 10/2001 | Addink et al. | |
| 6,314,340 B1 | 11/2001 | Mecham et al. | |
| 6,343,255 B1 | 1/2002 | Peek et al. | |
| 6,401,742 B1 | 6/2002 | Cramer et al. | |
| 6,402,048 B1 * | 6/2002 | Collins | 239/63 |
| 6,452,499 B1 | 9/2002 | Runge et al. | |
| 6,453,215 B1 | 9/2002 | Lavoie | |
| 6,453,216 B1 | 9/2002 | McCabe et al. | |
| 6,585,168 B1 | 7/2003 | Caprio | |
| 6,589,033 B1 | 7/2003 | Johnson et al. | |
| 6,675,098 B2 | 1/2004 | Peek et al. | |
| 6,714,134 B2 | 3/2004 | Addink et al. | |
| 6,748,327 B1 | 6/2004 | Watson | |
| 6,766,817 B2 | 7/2004 | da Silva | |
| 6,795,767 B2 * | 9/2004 | Nakamoto et al. | 701/115 |
| 6,823,239 B2 | 11/2004 | Sieminski | |
| 6,892,113 B1 | 5/2005 | Addink et al. | |
| 6,892,114 B1 | 5/2005 | Addink et al. | |
| 6,895,987 B2 | 5/2005 | Addink et al. | |
| 6,918,404 B2 | 7/2005 | da Silva | |
| 6,944,523 B2 | 9/2005 | Addink et al. | |
| 6,947,811 B2 | 9/2005 | Addink et al. | |
| 6,950,728 B1 | 9/2005 | Addink et al. | |
| 6,963,808 B1 | 11/2005 | Addink et al. | |
| 7,010,394 B2 | 3/2006 | Runge et al. | |
| 7,048,204 B1 | 5/2006 | Addink et al. | |
| 7,050,887 B2 | 5/2006 | Alvarez | |
| 7,058,478 B2 | 6/2006 | Alexanian | |
| 7,058,479 B2 | 6/2006 | Miller | |
| 7,063,270 B2 | 6/2006 | Bowers et al. | |
| 7,066,586 B2 | 6/2006 | da Silva | |
| 7,096,094 B2 | 8/2006 | Addink et al. | |
| 7,165,730 B2 | 1/2007 | Clark et al. | |
| 7,236,908 B2 | 6/2007 | Timko et al. | |
| 7,243,005 B1 | 7/2007 | Beutler et al. | |
| 7,248,945 B2 | 7/2007 | Woytowitz | |
| 7,266,428 B2 | 9/2007 | Alexanian | |
| 7,286,904 B2 | 10/2007 | Graham | |
| 7,317,972 B2 | 1/2008 | Addink et al. | |
| 7,330,796 B2 | 2/2008 | Addink et al. | |
| 7,337,042 B2 | 2/2008 | Marian et al. | |
| 7,363,113 B2 | 4/2008 | Runge et al. | |
| 7,403,840 B2 | 7/2008 | Moore et al. | |
| 7,406,363 B2 | 7/2008 | Doering et al. | |
| 7,412,303 B1 | 8/2008 | Porter et al. | |
| 7,413,380 B2 | 8/2008 | Corwon et al. | |
| 7,430,458 B2 | 9/2008 | Dansereau et al. | |
| 7,444,207 B2 | 10/2008 | Nickerson et al. | |
| 7,513,755 B2 | 4/2009 | Geisinger et al. | |
| 7,522,975 B2 | 4/2009 | Perez | |
| 7,532,954 B2 | 5/2009 | Evelyn-Veere | |
| 7,552,632 B2 | 6/2009 | Runge et al. | |
| 7,584,023 B1 | 9/2009 | Palmer et al. | |
| 7,596,429 B2 | 9/2009 | Cardinal et al. | |
| 7,613,546 B2 | 11/2009 | Nelson et al. | |
| 7,640,079 B2 | 12/2009 | Nickerson et al. | |
| 7,769,494 B1 | 8/2010 | Simon et al. | |
| 7,805,221 B2 | 9/2010 | Nickerson | |
| 7,810,515 B2 | 10/2010 | Nies et al. | |
| 7,853,363 B1 | 12/2010 | Porter et al. | |
| 7,877,168 B1 | 1/2011 | Porter et al. | |
| 7,957,843 B2 | 6/2011 | Sacks | |
| 8,145,357 B2 | 3/2012 | Nibler et al. | |
| 2001/0049563 A1 | 12/2001 | Addink et al. | |
| 2002/0002425 A1 | 1/2002 | Dossey et al. | |
| 2002/0010516 A1 | 1/2002 | Addink | |
| 2002/0020441 A1 | 2/2002 | Addink | |
| 2002/0027504 A1 | 3/2002 | Davis | |
| 2002/0060631 A1 | 5/2002 | Runge et al. | |
| 2002/0072829 A1 | 6/2002 | Addink et al. | |
| 2002/0091452 A1 | 7/2002 | Addink et al. | |
| 2002/0092954 A1 | 7/2002 | Addink et al. | |
| 2003/0025400 A1 | 2/2003 | Hall | |
| 2003/0080199 A1 | 5/2003 | Condreva | |
| 2003/0109964 A1 | 6/2003 | Addink et al. | |
| 2003/0178070 A1 | 9/2003 | Glicken | |
| 2003/0179102 A1 | 9/2003 | Barnes | |
| 2003/0182022 A1 | 9/2003 | Addink et al. | |
| 2003/0183018 A1 | 10/2003 | Addink et al. | |
| 2003/0208306 A1 | 11/2003 | Addink et al. | |
| 2003/0230638 A1 | 12/2003 | Dukes et al. | |
| 2004/0011880 A1 | 1/2004 | Addink et al. | |
| 2004/0015270 A1 | 1/2004 | Addink et al. | |
| 2004/0039489 A1 | 2/2004 | Moore et al. | |

| | | | |
|---|---|---|---|
| 2004/0089164 A1 | 5/2004 | Addink et al. | |
| 2004/0117070 A1 | 6/2004 | Barker | |
| 2004/0217189 A1 | 11/2004 | Regli | |
| 2005/0019184 A1 | 1/2005 | Geisinger et al. | |
| 2005/0137752 A1 | 6/2005 | Alvarez | |
| 2005/0187665 A1* | 8/2005 | Fu | 700/284 |
| 2005/0250440 A1 | 11/2005 | Zhou et al. | |
| 2005/0279856 A1* | 12/2005 | Nalbandian et al. | 239/76 |
| 2006/0043208 A1 | 3/2006 | Graham | |
| 2006/0091245 A1 | 5/2006 | Ivans | |
| 2006/0116792 A1 | 6/2006 | Addink | |
| 2006/0122735 A1 | 6/2006 | Goldberg et al. | |
| 2006/0155489 A1 | 7/2006 | Addink | |
| 2006/0217846 A1 | 9/2006 | Woytowitz | |
| 2006/0293797 A1 | 12/2006 | Weiler | |
| 2007/0016334 A1 | 1/2007 | Smith et al. | |
| 2007/0156318 A1 | 7/2007 | Anderson et al. | |
| 2007/0179674 A1 | 8/2007 | Ensworth et al. | |
| 2007/0191991 A1 | 8/2007 | Addink | |
| 2007/0221744 A1 | 9/2007 | Simon et al. | |
| 2007/0282486 A1 | 12/2007 | Walker et al. | |
| 2007/0293990 A1 | 12/2007 | Alexanain | |
| 2008/0027586 A1 | 1/2008 | Hern et al. | |
| 2008/0119948 A1 | 5/2008 | O'Connor | |
| 2008/0167931 A1 | 7/2008 | Gerstemeier et al. | |
| 2009/0043427 A1 | 2/2009 | Addink | |
| 2009/0094097 A1 | 4/2009 | Gardenswartz | |
| 2009/0138105 A1 | 5/2009 | Crawford | |
| 2009/0202366 A1 | 8/2009 | Geisinger et al. | |
| 2009/0281672 A1 | 11/2009 | Pourzia | |
| 2010/0030389 A1 | 2/2010 | Palmer et al. | |
| 2010/0030476 A1 | 2/2010 | Woytowitz | |
| 2010/0094472 A1 | 4/2010 | Woytowitz | |
| 2010/0106337 A1 | 4/2010 | Sacks | |
| 2010/0145530 A1 | 6/2010 | Nickerson | |
| 2010/0256827 A1 | 10/2010 | Bragg et al. | |
| 2010/0312404 A1 | 12/2010 | Nickerson | |
| 2011/0077785 A1 | 3/2011 | Nickerson et al. | |
| 2011/0238229 A1 | 9/2011 | Woytowitz et al. | |

OTHER PUBLICATIONS

"Reclamation, Managing Water in the West—Weather Based Technologies for Residential Irrigation Scheduling," Technical Review Report, U.S. Dept. of the Interior, May 2004.*
Hunt, T. and Lessick, D. et al., Residential Weather-Based Irrigation Scheduling: Evidence from the Irvine "ET Controller" Study (2001).
List of Principal Symbols and Acronyms; 2003, five web pages.
Cattaneo & Upham, Methods to Calculate Evapotranspiration Differences and Choices, 3-page article.
Water-Efficient Landscaping; 2001, 2-page article.
The Irrigation Association—Water Management Committee, Turf and Landscape Irrigation Best Management Practice, Appendix G, Deficit Irrigation Practice.
Engineer's Notebook No. 106, A Simple Evapotranspiration Model for Hawaii: The Hargreaves Model; CTAHR Fact Sheet, 1-page article, May 1997, WU.
Austin Lawn Sprinkler Association, Technical Information-Using Evapotranspiration Data; Nov. 2002, 1-page webpage.
ET Different Formula, 1-page Chart.
USFAO, Preface page Web Page, Feb. 2003.
US Department of the Interior Bureau of Reclamation Lower Colorado Region Southern California Area Office, Temecula, California & Technical Service Center Water Resources Planning Operations Support Group, Denver, Colorado; Weather and Soil Moisture Based Landscape Irrigation Scheduling Devices; Reclamation Managing Water in the West, Aug. 2004; 135 pages.
Instructions, Model PK-1B pump controller, Mar. 1993.
"Irrigation & Green Industry" Magazine, Nov. 2010.
Universal Smart Module brochure, Aug. 2009.
Smart Clock brochure, original from approx. May 2007.
WeatherSmartPro brochure, Oct. 2009.
Aqua Conserve User's Guide, Jun. 2010.
Aqua Conserve ET-8 Series Manual, 2010.
Climate Logic wireless weather sensing system flyer, Nov. 2010.
WeatherSmart manual, Mar. 2010.
Irritrol, "Climate Logic" user manual, 2011.
Rain Bird, Simple-to-Set Smart Controller Operation Manual, 2010.
Hunter, X-Core residential irrigation controller manual, 2010.
Solar Sync sensors, 2011.
Metropolitan Water District of Southern California, The Watering Index and Watering Calculator, 2011.
Metropolitan Water District of Southern California, Save a Buck: Irrigation Controllers, 2011.
Enercon Plus Brochure, original from approx. May 2007.
WeatherSmartPro brochure, Mar. 2010.
SolarSync brochure, Oct. 2009.
SolarSync Owner's Manual and Programming Instructions, Dec. 2009.
Toro ECXTRA Automatic Sprinkler System Control Timer, User's Guide.
Toro XTRA SMART Wireless weather sensor system installation and setup guide.
AquaConserve ACT-9 and ACT-14 Station Aqua Climate Tracker Irrigation Controller User's Guide (2001).
AquaConserve ACT-9 and ACT-14 Quick Reference & Installation Guide (2001).
TORO Xtra Smart Wireless Weather Sensor System Installation and Setup Guide (2010).
"Report on Perofrmance of ET Based Irrigation Controller—Analysis of Operation of WeatherTRAK (TM) Controller in Field Conditions During 2002," Aquacraft,lnc. Apr. 23, 2003.

* cited by examiner

| Month | Temp Budget | ET |
|---|---|---|
| Jan | 25.61% | 23.18% |
| Feb | 32.61% | 29.82% |
| Mar | 56.31% | 53.62% |
| Apr | 72.02% | 72.23% |
| May | 88.90% | 88.47% |
| Jun | 97.90% | 96.19% |
| Jul | 100.00% | 100.00% |
| Aug | 94.09% | 92.93% |
| Sep | 69.78% | 70.39% |
| Oct | 51.06% | 53.07% |
| Nov | 34.09% | 29.09% |
| Dec | 25.98% | 25.67% |

| \multicolumn{13}{c}{Extraterrestrial Radiation (RA) Expressed in Equivalent Evaporation (In mm/day)} |
| Jan. (1) | Feb. (2) | Mar (3) | Apr. (4) | May (5) | Jun. (6) | Jul. (7) | Aug. (8) | Sep. (9) | Oct. (10) | Nov. (11) | Dec. (12) | Latitude (degrees) (13) |
|---|---|---|---|---|---|---|---|---|---|---|---|---|
| \multicolumn{13}{c}{(a) Northern Hemisphere} |
| 3.8 | 6.1 | 9.4 | 12.7 | 15.8 | 17.1 | 18.4 | 14.1 | 10.9 | 7.4 | 4.5 | 3.1 | 50 |
| 4.3 | 6.6 | 9.8 | 13.0 | 15.9 | 17.2 | 16.5 | 14.3 | 11.2 | 7.8 | 5.0 | 3.7 | 48 |
| 4.9 | 7.1 | 10.2 | 13.3 | 16.0 | 17.2 | 16.6 | 14.5 | 11.5 | 8.3 | 5.5 | 4.3 | 45 |
| 5.3 | 7.6 | 10.6 | 13.7 | 16.1 | 17.2 | 16.6 | 14.7 | 11.9 | 8.7 | 6.0 | 4.7 | 44 |
| 5.9 | 8.1 | 11.0 | 14.0 | 16.2 | 17.3 | 16.7 | 15.0 | 12.2 | 9.1 | 6.5 | 5.2 | 42 |
| 6.4 | 8.6 | 11.4 | 14.3 | 16.4 | 17.3 | 16.7 | 15.2 | 12.5 | 9.6 | 7.0 | 5.7 | 40 |
| 6.9 | 9.0 | 11.8 | 14.5 | 16.4 | 17.2 | 16.7 | 15.3 | 12.8 | 10.0 | 7.5 | 6.1 | 38 |
| 7.4 | 9.4 | 12.1 | 14.7 | 16.4 | 17.2 | 16.7 | 15.4 | 13.1 | 10.6 | 8.0 | 6.6 | 36 |
| 7.9 | 9.8 | 12.4 | 14.8 | 16.5 | 17.1 | 16.8 | 15.5 | 13.4 | 10.8 | 8.5 | 7.2 | 34 |
| 8.3 | 10.2 | 12.8 | 15.0 | 16.5 | 17.0 | 16.8 | 15.6 | 13.6 | 11.2 | 9.0 | 7.8 | 32 |
| 8.8 | 10.7 | 13.1 | 15.2 | 18.5 | 17.0 | 16.8 | 15.7 | 13.9 | 11.8 | 9.5 | 8.3 | 30 |
| 9.3 | 11.1 | 13.4 | 15.3 | 16.5 | 16.8 | 16.7 | 15.7 | 14.1 | 12.0 | 9.9 | 8.8 | 28 |
| 9.8 | 11.5 | 13.7 | 15.3 | 16.4 | 18.7 | 16.6 | 15.7 | 14.3 | 12.3 | 10.3 | 9.3 | 20 |

Fig. 6

| Extraterrestrial Radiation (RA) Expressed in Equivalent Evaporation (In mm/day) | | | | | | | | | | | | |
|---|---|---|---|---|---|---|---|---|---|---|---|---|
| Jan. (1) | Feb. (2) | Mar (3) | Apr. (4) | May (5) | Jun. (6) | Jul. (7) | Aug. (8) | Sep. (9) | Oct. (10) | Nov. (11) | Dec. (12) | Latitude (degrees) (13) |
| (a) Northern Hemisphere | | | | | | | | | | | | |
| 10.2 | 11.9 | 13.9 | 15.4 | 18.4 | 16.6 | 16.5 | 15.8 | 14.5 | 12.6 | 10.7 | 9.7 | 24 |
| 10.7 | 12.3 | 14.2 | 15.5 | 18.3 | 16.4 | 16.5 | 15.8 | 14.6 | 13.0 | 11.1 | 10.2 | 22 |
| 11.2 | 12.7 | 14.4 | 15.8 | 16.3 | 16.4 | 16.3 | 15.9 | 14.8 | 13.3 | 11.6 | 10.7 | 20 |
| 11.6 | 13.0 | 14.6 | 15.6 | 16.1 | 18.1 | 18.1 | 15.8 | 14.9 | 13.6 | 12.0 | 11.1 | 18 |
| 12.0 | 13.3 | 14.7 | 15.6 | 16.0 | 15.9 | 15.9 | 15.7 | 15.0 | 13.9 | 12.4 | 11.6 | 18 |
| 12.4 | 13.6 | 14.9 | 15.7 | 15.8 | 15.7 | 15.7 | 15.7 | 15.1 | 14.1 | 12.8 | 12.0 | 14 |
| 12.8 | 13.9 | 15.1 | 15.7 | 15.7 | 15.5 | 15.5 | 15.6 | 15.2 | 14.4 | 13.3 | 12.5 | 12 |
| 13.2 | 14.2 | 15.3 | 16.7 | 15.5 | 15.3 | 15.3 | 15.5 | 15.3 | 14.7 | 13.6 | 12.9 | 10 |
| 13.6 | 14.5 | 15.3 | 15.6 | 15.3 | 15.0 | 15.1 | 15.4 | 15.3 | 14.8 | 13.9 | 13.3 | 8 |
| 13.9 | 14.8 | 15.4 | 15.4 | 15.1 | 14.7 | 14.9 | 15.2 | 15.3 | 15.0 | 14.2 | 13.7 | 6 |
| 14.3 | 15.0 | 15.5 | 15.5 | 14.9 | 14.4 | 14.6 | 15.1 | 15.3 | 15.1 | 14.5 | 14.1 | 4 |
| 14.7 | 15.3 | 15.6 | 15.3 | 14.6 | 14.2 | 14.3 | 14.9 | 15.3 | 15.3 | 14.8 | 14.4 | 2 |
| 15.0 | 15.5 | 15.7 | 15.3 | 14.4 | 13.9 | 14.1 | 14.8 | 15.3 | 15.4 | 15.1 | 14.8 | 0 |

Fig. 6 (continued)

| Extraterrestrial Radiation (RA) Expressed in Equivalent Evaporation (In mm/day) | | | | | | | | | | | | Latitude (degrees) |
|---|---|---|---|---|---|---|---|---|---|---|---|---|
| Jan. (1) | Feb. (2) | Mar (3) | Apr. (4) | May (5) | Jun. (6) | Jul. (7) | Aug. (8) | Sep. (9) | Oct. (10) | Nov. (11) | Dec. (12) | (13) |
| (b) Southern Hemisphere | | | | | | | | | | | | |
| 17.5 | 14.7 | 10.9 | 7.0 | 4.2 | 3.1 | 3.5 | 5.5 | 8.9 | 12.9 | 18.5 | 18.2 | 50 |
| 17.6 | 14.9 | 11.2 | 7.5 | 4.7 | 3.5 | 4.0 | 6.0 | 9.3 | 13.2 | 16.8 | 18.2 | 48 |
| 17.7 | 15.1 | 11.5 | 7.9 | 5.2 | 4.0 | 4.4 | 6.5 | 9.7 | 13.4 | 16.7 | 18.3 | 46 |
| 17.8 | 15.3 | 11.9 | 8.4 | 5.7 | 4.4 | 4.9 | 6.9 | 10.2 | 13.7 | 16.7 | 18.3 | 44 |
| 17.8 | 15.5 | 12.2 | 8.8 | 6.1 | 4.8 | 5.4 | 7.4 | 10.6 | 14.0 | 16.8 | 18.3 | 42 |
| 17.9 | 15.7 | 12.5 | 9.2 | 6.6 | 5.3 | 5.9 | 7.9 | 11.0 | 14.2 | 16.9 | 18.3 | 40 |
| 17.9 | 15.8 | 12.8 | 9.6 | 7.1 | 5.8 | 6.3 | 8.3 | 11.4 | 14.4 | 17.0 | 18.3 | 38 |
| 17.9 | 16.0 | 13.2 | 10.1 | 7.5 | 6.3 | 6.8 | 8.8 | 11.7 | 14.6 | 17.0 | 18.2 | 36 |
| 17.8 | 16.1 | 13.5 | 10.5 | 8.0 | 6.8 | 7.2 | 9.2 | 12.0 | 14.9 | 17.1 | 18.2 | 34 |
| 17.8 | 16.2 | 13.8 | 10.9 | 8.5 | 7.3 | 7.7 | 9.6 | 12.4 | 15.1 | 17.2 | 18.1 | 32 |
| 17.8 | 16.4 | 14.0 | 11.3 | 8.9 | 7.8 | 8.1 | 10.1 | 12.7 | 15.3 | 17.3 | 18.1 | 30 |
| 17.7 | 16.4 | 14.3 | 11.6 | 9.3 | 8.2 | 8.6 | 10.4 | 13.0 | 15.4 | 17.2 | 17.9 | 28 |
| 17.6 | 16.4 | 14.4 | 12.0 | 9.7 | 8.7 | 9.1 | 10.9 | 13.2 | 15.5 | 17.2 | 17.8 | 26 |

Fig. 6 (continued)

Extraterrestrial Radiation (RA) Expressed in Equivalent Evaporation (In mm/day)

| Jan. (1) | Feb. (2) | Mar (3) | Apr. (4) | May (5) | Jun. (6) | Jul. (7) | Aug. (8) | Sep. (9) | Oct. (10) | Nov. (11) | Dec. (12) | Latitude (degrees) (13) |
|---|---|---|---|---|---|---|---|---|---|---|---|---|
| | | | | | | (b) Southern Hemisphere | | | | | | |
| 17.5 | 16.5 | 14.6 | 12.3 | 10.2 | 9.1 | 9.5 | 11.2 | 13.4 | 15.6 | 17.1 | 17.7 | 24 |
| 17.4 | 16.5 | 14.8 | 12.6 | 10.6 | 9.5 | 10.0 | 11.6 | 13.7 | 15.7 | 17.0 | 17.5 | 22 |
| 17.3 | 16.5 | 15.0 | 13.0 | 11.0 | 10.0 | 10.4 | 12.0 | 13.9 | 15.8 | 17.0 | 17.4 | 20 |
| 17.1 | 16.5 | 15.1 | 13.2 | 11.4 | 10.4 | 10.8 | 12.3 | 14.1 | 15.8 | 16.8 | 17.1 | 18 |
| 16.9 | 16.4 | 15.2 | 13.5 | 11.7 | 10.8 | 11.2 | 12.6 | 14.3 | 15.8 | 16.7 | 16.8 | 16 |
| 16.7 | 16.4 | 15.3 | 13.7 | 12.1 | 11.2 | 11.6 | 12.9 | 14.5 | 15.8 | 16.5 | 16.8 | 14 |
| 16.6 | 16.3 | 15.4 | 14.0 | 12.5 | 11.6 | 12.0 | 13.2 | 14.7 | 15.8 | 16.4 | 16.5 | 12 |
| 16.4 | 16.3 | 15.5 | 14.2 | 12.8 | 12.0 | 12.4 | 13.5 | 14.8 | 15.9 | 16.2 | 16.2 | 10 |
| 16.1 | 16.1 | 15.5 | 14.4 | 13.1 | 12.4 | 12.7 | 13.7 | 14.9 | 15.8 | 16.0 | 16.0 | 8 |
| 15.8 | 16.0 | 15.6 | 14.7 | 13.4 | 12.8 | 13.1 | 14.0 | 15.0 | 15.7 | 15.8 | 15.7 | 6 |
| 15.5 | 15.8 | 15.6 | 14.9 | 13.8 | 13.2 | 13.4 | 14.3 | 15.1 | 15.6 | 15.5 | 15.4 | 4 |
| 15.3 | 15.7 | 15.7 | 15.1 | 14.1 | 13.5 | 13.7 | 14.5 | 15.2 | 15.5 | 16.3 | 15.1 | 2 |
| 15.0 | 15.5 | 15.7 | 15.3 | 14.4 | 13.9 | 14.1 | 14.8 | 15.3 | 15.4 | 15.1 | 14.8 | 0 |

Fig. 6 (continued)

IRRIGATION CONTROLLER WATER MANAGEMENT WITH TEMPERATURE BUDGETING

This is a continuation of U.S. Utility patent application Ser. No. 12/955,839 filed on Nov. 29, 2010, which is a continuation-in-part of application Ser. No. 11/879,700 filed on Jul. 17, 2007, now U.S. Pat. No. 7,844,368, which is a continuation-in-part of U.S. Utility patent application Ser. No. 11/336,690 filed on Jan. 20, 2006, now U.S. Pat. No. 7,266,428, which is a continuation-in-part of U.S. Utility patent application Ser. No. 10/824,667 filed on Apr. 13, 2004, now U.S. Pat. No. 7,058,478, which claims the benefit of U.S. Provisional Application No. 60/465,457 filed on Apr. 25, 2003, all of which are incorporated herein in their entirety by this reference.

The specification, abstract and drawings herein are identical to (and a continuation of great-great grandparent) U.S. Utility patent application Ser. No. 10/824,667 filed on Apr. 13, 2004, now U.S. Pat. No. 7,058,478.

BACKGROUND OF THE INVENTION

1. Field of the Invention

The present invention relates to the management and conservation of irrigation water, primarily for, but not limited to, residential and commercial landscaping applications, and more specifically, to a greatly simplified method for doing so based upon seasonal temperature variations and geographic locations.

2. Description of the Prior Art

Many regions of the United States lack sufficient water resources to satisfy all of their competing agricultural, urban, commercial and environmental needs. The "California Water Plan Update, Bulletin 160-98," published by the California Department of Water Resources using 1995 calendar year data, estimated that approximately 121.1 million acre feet (maf) of water is needed to satisfy the annual water needs of the State of California alone. Of this amount, approximately forty-six percent is required for environmental purposes, forty-three percent for agricultural purposes, and eleven percent (approximately 13.3 maf) for usage in urban areas. The Bulletin further estimated that California suffers a shortage of 1.6 maf during normal years, and 5.1 maf in drought years. These shortages are expected to increase steadily through the year 2020 due to expected significant increases in the state population.

At the Feb. 17, 2004, EPA-sponsored "Water Efficient Product Market Enhancement Program" in Phoenix, Ariz., for landscaping irrigation systems and controllers, it was projected that thirty-six states will have severe water shortages by the year 2010. A significant portion of this projected shortage was attributed to user neglect and irrigation controller inefficiency. The 2003 California census revealed that there were over twenty million single family residences and apartments within the state. The California Urban Water Conservation Council estimated that the average household utilized one-half acre foot of water (162,500 gallons) annually, and that fifty-five percent (89,375 gallons) of this amount was used for landscape irrigation. It further estimated that approximately one-third of the irrigation water was wasted, either due to inefficient irrigation systems or inadequate controller programming, oftentimes due in part to complicated controller programming procedures required of the operator. This results in a total annual waste of 1.81 maf of water for California households alone. Excessive water usages in municipal and commercial areas, golf courses and schools further contribute to the water shortage.

Such water shortages have forced many municipalities to enact strict water conservation measures. For its part, the agricultural industry has responded to this shortage by resorting to drip, micro and other low-volume irrigation systems. Urban communities have imposed strict irrigation schedules, and required the installation of water meters and auditors to enforce those schedules. Commercial and environmental users have enacted similar measures. However, there is no consensus among these various consumers as to the most effective water conservation method or automated control system.

Residential and commercial irrigation consumers are responsible for a significant percentage of wasted water. A report entitled "Water Efficient Landscaping" by the United States Environmental Protection Agency (EPA), dated September 2002, publication number EPA832-F-02-002, states the following: "[a]ccording to the U.S. Geological Survey, of the 26 billion gallons of water consumed daily in the United States (Amy Vickers, 2002 "Handbook of Water Use and Conservation"), approximately 7.8 billion gallons, or 30% is devoted to outdoor uses. The majority of this is used for landscaping"

A significant reason for this over-utilization of landscape water was revealed in a marketing study conducted by the Irrigation Association (IA) and presented at the 2003 IA "Smart Water Application Technology" conference in San Diego, Calif. The study indicated that most consumers typically adjust their irrigation schedule only two to five times per year, rather than on a daily or weekly basis, regardless of changes in environmental conditions. The relatively high cost of labor in many municipalities further prohibits frequent manual adjustments of irrigation controllers. This generally results in over-irrigation and runoff, particularly during the off-seasons, oftentimes by as much as one to two hundred percent. Furthermore, in municipalities that limit irrigation to certain days or intervals, the common practice is to over-water during the permitted watering periods in order to "carry over" until the next watering period. However, this practice is counter-productive, in that severe over-irrigation results in increased water run-off and evaporation.

Soil moisture sensing devices and other methods of water conservation, have been available for decades, but have enjoyed only limited success. Such devices and methods generally call for inserting moisture sensors into the soil to measure the soil moisture content. Newer soil moisture sensing technologies have more recently been developed, and claim to be theoretically accurate in measuring plant water needs. However, regardless of the level of technology, such devices and methods are often problematic due to the location and number of sensors necessary to obtain accurate soil moisture readings, the high costs of installing and maintaining the sensors, and the integrity and reliability of the sensors data.

Other irrigation controllers utilize meteorological data to estimate the evapotranspiration, or ET, for a particular region. This ET represents the amount of water needed by plants to replace water lost through plant absorption and evaporation, and is expressed in inches or millimeters of water per day. The United States Food and Agriculture Office (USFAO), in its Irrigation and Drainage Paper No. 24, entitled "Crop Water Requirements," noted that "a large number of more or less empirical methods have been developed over the last fifty years by numerous scientists and specialists worldwide to estimate ET from different climatic variables."

There are at least 15 different ET formulas. Each of these formulas provides a different result for the reference ET (ETo). In their paper entitled "Methods to Calculate Evapotranspiration: Differences and Choices," Diego Cattaneo and Luke Upham performed a four-year comparison of four different ETo formulas—the Penman-Monteith formula, the Schwab formula, the Penman formula, and the Penman program. The comparison revealed that the results from the four recognized formulas sometimes varied by as much as seventy-five percent.

The Penman-Monteith formula is currently recommended as the "standard" by both the USFAO and California Irrigation Management Information System (CIMIS), with variances of less than twenty percent considered ideal. The Penman-Monteith formula is as follows:

$$ETo = \frac{\Delta(Rn - G)}{\lambda[\Delta + Y(1 + CdU2)]} + \frac{y\frac{37}{Ta + 273.16}U2(Es - Ea)}{\Delta + Y(1 + CdU2)}$$

The variables within this formula represent the following:
ETo=grass reference evapotranspiration in millimeters per day.
$\Delta$=slope of saturation vapor pressure curve kPa° C. at the mean air temperature.
Rn=net radiation (MJm$^{-2}$h$^{-1}$).
G=soil heat flux density (MJm$^{-2}$h$^{-1}$).
Y=psychrometric constant (kPa° C.).
Ta=mean hourly air temperature (° C.).
U2=wind speed at two meters (m s$^{-1}$).
Es=saturation vapor pressure (kPa) at the mean hourly air temperature in ° C.
Ea=actual vapor pressure (kPa) at the mean hourly air temperature in ° C.
$\lambda$=latent heat of vaporization (MJkg$^{-1}$).
Cd=bulk surface resistance and aerodynamics resistance coefficient.

The simplest ET formula is the Hargreaves formula proposed by the College of Tropical Agriculture and Human Resources at the University of Hawaii at Manoa. Its equation is described in the College's Fact Sheet Engineer's Notebook No. 106, published May 1997, in an article entitled "[a] Simple Evapotranspiration Model for Hawaii," as follows:

$ETo=0.0135(T+17.18)Rs$

The variables within this formula represent the following:
ETo=potential daily evapotranspiration in mm/day.
T=mean daily temperature (° C.).
Rs=incident solar radiation converted to millimeters of water per day (MJ).

This formula is theoretical and, to the inventor's knowledge, untested. Furthermore, it relies upon the same ET theories and interrelationships as the other formulas disclosed above. As described herein, such reliance causes the Hargreaves formula to possess the same shortcomings as the other ET formulas.

A number of irrigation controller manufacturers offer "smart" (self-adjusting) irrigation controllers. Such controllers generally incorporate some form of ET. Several of them obtain the environmental data to calculate ET from historical records, while others utilize adjacently located weather stations to obtain real-time data. Others receive such information from a network of existing weather stations by radio, satellite or pager means.

The following U.S. patents all disclose various methods by which an irrigation controller calculates or adjusts an irrigation schedule based upon historical, distal, or local ETo: U.S. Pat. Nos. 4,962,522; 5,208,855; 5,479,339; 5,696,671; and 6,298,285. All of these methods calculate ETo values or receive them from external sources, and use such values to adjust and regulate irrigation. Such external sources may be CIMIS ET databases, local sensors, cable lines or broadcast stations. Several of these methods also utilize other data, such as precipitation.

Unfortunately, methods incorporating ET formulas, and the installation, comprehension and programming of controllers utilizing such methods, including those cited in the referenced patents above, are far too complex for the average user to understand and implement. Such a conclusion was reached in a recent study of ET controllers by the Irvine Ranch Water District, entitled "Residential Weather Based Irrigation Scheduling Study." The study stated the following: "The water agency solution to date has been to conduct residential audits, leaving the homeowner with a suggested watering schedule, hoping it would then be followed. These programs have had limited effect and a short-term impact. A preferred solution would be to install irrigation controllers that automatically adjust watering times based on local weather conditions. Unfortunately, until now, these large landscape control systems have been far too complex and expensive for residential applications."

Such complexity is underscored by the one hundred forty-five principal symbols and acronyms identified by the USFAO for use and description of the factors and variables related to ET theory and its various formulas, covering such variables as: the capillary rise; the resistance correction factor; the soil heat capacity; the psychrometer coefficient; and the bulk stomatal resistance of a well-illuminated leaf. The sheer number of variables renders ET theory difficult to explain, understand and apply, especially for an unsophisticated consumer with little or no scientific or meteorological background. For example, the manual for one ET-based controller currently on the market comprises over one hundred fifty pages of instructions and explanations. Such unfamiliarity and complexity increase the margins of error already associated with the various ET formulas, further diminishing their effectiveness.

Water districts, irrigation consultants, manufacturers, the Irrigation Association, the Center for Irrigation Technology and other attendees at the EPA's Water Efficient Product Market Enhancement Program estimated that, due to the complexity, cost, impracticality of installation and difficulty in programming current irrigation controllers, less than one percent of all commercial and residential landscape irrigation systems currently and effectively utilize some form of the ET or moisture sensing method. Such scattered adoption exists despite over fifty years of ET research, and over thirty years of ground moisture sensing technology. The magnitude of such ineffectiveness is underscored by the fact that there are over two million new controllers installed annually in the United States alone, and over fifty million controllers in use today. Even if the ET or ground moisture sensing methods provided one hundred percent efficiency, which they do not, the limited adoption of these methods renders them an ineffective means of significant water conservation, since only one percent of the runoff and water waste would be prevented under perfectly-efficient conditions.

A second shortcoming of the ET method is its dependence upon numerous categories of local, real-time meteorological data. As indicated above, many variables must be measured in order to calculate ET. Data for each variable must be obtained by separate sensors, each one installed in a particular location. Such particularity requires an understanding of local environmental conditions and meteorology. Furthermore, accuracy requires that the data be received from local sensors—given the numerous microclimates existing within any one geographical area, data received from remotely located sensors may be inaccurate. The data must also be received and processed in real-time, since average or historical ET data may be inaccurate during periods of unusual or excessive heat, cold, or rain, or other deviations from historical climate patterns. Any inaccurate data would result in even greater ET deviations and inefficient irrigation.

ET measuring devices are generally also expensive to install and maintain. Sensors or weather stations must be placed within each microclimate to measure the different variables utilized by the formula of choice. Each weather station may cost up to several thousand dollars. Furthermore, all of these sensors or stations must undergo regular inspection, maintenance and calibration to insure that they continue to provide accurate data. This further increases the actual cost of each station. The sensors and stations must also be powered in some manner—depending upon the particular geographic location, AC power may not be readily available. All of these considerations increase the cost of implementing an ET-based irrigation system to a prohibitive level, and limit the widespread adoption of this method. Finally, all of this assumes that the weather station or sensors is even installable in a particular area—some areas, such as street medians or parks, are not suitable for weather station or sensor installation due to aesthetic reasons or the likelihood of vandalism.

Another shortcoming of ET-based controllers is that all of the ETo formulas (including the Hargreaves formula) are generally expressed in hundredths of an inch, or millimeters, of water per day. Thus, ETo must be converted to an actual irrigation time of minutes. Such a conversion is dependent upon the characteristics of the particular hydraulic system, such as the valve sizes, water flow rates, and sprinkler or drip irrigation precipitation rates. One conversion formula, proposed by the Austin (Texas) Lawn Sprinkler Association, calculates the sprinkler run time in minutes (T) as follows:

$$T = \frac{60 \times ETo \times Kc}{Pr \times Ea}$$

The variables within this equation represent the following:
ETo=reference evapotranspiration rate, in inches.
Kc=the percentage crop coefficient.
Pr=the sprinkler precipitation rate, in inches per hour.
Ea=the percentage application efficiency of the hydraulics system.

As an example of such complexity, the crop coefficient (Kc) is different for each crop or landscape plant or grass type. Determining the precipitation rate (Pr) requires knowledge of the hydraulic system specifications—the particular types of valves and sprinklers, the number of valves and sprinklers within the system, the water flow rate and operating pressure. Such information is not readily available to the average consumer. Instead, the consumer must expend additional time and money to retain an irrigation expert to configure and install the system.

Another ET-to-irrigation-time conversion method, the 'deficit irrigation practice,' was proposed by the IA Water Management Committee in Appendix G of its October 2002 article entitled "Turf and Landscape Irrigation Best Management Practices." Such conversion method comprised of ten separate formulas, and utilized a total of twenty-nine variables and constants, not including those utilized in calculating the ET value. Many of these variables represented concepts and relationships difficult for the average irrigation designer, much less a consumer, to understand, such as: the local landscape coefficient for the particular vegetation; available water depending upon the particular soil composition; allowable water depletion rate from the root zone; maximum percentage allowable depletion without plant stress; the water management factor necessary to overcome water management inefficiency; the whole day stress-based irrigation interval; water flow rates for the particular system; and, of course, ET.

Due to the urgency arising from severe national drought and environmental conditions, and the shortcomings of the various present technologies, the irrigation industry is currently researching alternative methods for water conservation and prevention of unattended runoff. The Center for Irrigation Technology in Fresno, Calif., along with other educational and research institutions and water conservation agencies, is conducting studies to determine the most effective water conservation method. On the national level, the EPA is considering the introduction of a "WaterStar" irrigation efficiency rating program similar to the "EnergyStar" rating system currently in use for equipment energy efficiency. The purpose of such an irrigation efficiency rating program is to promote consumer awareness and compliance as an alternative to mandated water conservation measures which would severely and negatively impact the irrigation industry, landscape aesthetics and the ecology.

It is clear from the foregoing discussion that the irrigation water management industry, in view of a politically and economically sensitive, and urgent, water crisis, is pursuing highly scientific, mathematical and/or technical approaches for resolving the problems of wasted irrigation water and drought conditions. Unsurprisingly, such approaches have met with limited success. The EPA, United States Department of Energy (DOE), ecologists, environmentalists, municipalities, water agencies, and research institutions are all searching for new methods that provide practical (as opposed to theoretical) irrigation efficiency—methods that overcome the particular shortcomings of the prior art.

Landscape water conservation also provides additional benefits. As noted by the EPA in its "Water Efficient Landscaping" guidelines, landscape water conservation also results in "decreased energy use (and air pollution associated with its generation) because less pumping and treatment of water is required and reduced runoff of storm water and irrigation water that carries top soils, fertilizers, and pesticides into lakes, rivers, and streams, fewer yard trimmings, reduced landscaping labor and maintenance costs, and extended life for water resources infrastructures (e.g. reservoirs, treatment plants, groundwater aquifers), thus reduced taxpayer costs." Thus, there is an urgent need for irrigation systems that conserve water and energy, and minimize negative impact upon the environment, by automatically adjusting their schedules periodically in response to meteorological and seasonal changes.

The problem of irrigation mismanagement, and the main hurdle faced by these entities, can be simply summarized as follows: once a system is properly designed, most of the wasted landscape irrigation water and runoff is caused by not adjusting for daily, periodic, or seasonal changes. Such inaction is usually caused by the complexity and difficulty of determining the particular adjustment amounts. With that in mind, a correspondingly simple intuitive solution would be highly preferred over the existing highly theoretical and technical, but impractical, state of the art in moisture sensing and ET-based control systems.

It is therefore desirable to provide a simple, user-intuitive, and therefore readily accepted water conservation approach, particularly for a clearly understood automated method of calculating and implementing irrigation schedules. It is further desirable to provide a method that does not necessarily rely upon ground or air moisture sensing means, weather stations, or ET (either directly, or as a basis for deriving the sprinkler operating times). It is further desirable to provide a method that minimizes the margins and sources of errors by minimizing the number of sensor inputs required by the variables in the formula. It is further desirable to provide a method that utilizes minimal local, real-time meteorological data. It is further desirable that such a method be cost-efficient, affordable and usable by a large number of people and entities within the different industries. It is further desirable that such a method be understandable by the average consumer. It is further desirable that such a method be accomplished automatically, without requiring regular manual adjustments by the operator of the irrigation watering time settings or schedules.

SUMMARY OF THE INVENTION

The present invention provides a simple and automated method for water conservation and management, one which minimizes runoff, and is totally independent of ground or air moisture sensing, measured solar radiation, weather stations, ET, or complicated formulas for calculating irrigation durations or sprinkler operating times based upon ETo. Instead, the present invention relies almost exclusively upon the time of year, local real-time temperature data and its particular geographic location, to calculate and adjust an irrigation schedule on a daily or periodic basis Minimizing the number of variables in this manner renders the present invention easier and less expensive to install, operate and maintain, and therefore, much more appealing to the public.

Such a method is based upon the following universally understood concepts:
1. More water is required to irrigate landscape or crops during periods of warmer temperatures.
2. Less water is required during periods of cooler temperatures.
3. Little or no water is required or desired below a certain temperature, or during certain times of the year.
4. No irrigation is required while it is raining, or for a period thereafter.

The irrigation controller of the present invention may be provided in a commercially available device having the following components: a means for an operator to enter data into the controller, such as a keyboard, touch screen, dial, magnetic card readers or remote device; a microprocessor to compute and adjust the irrigation schedule according to the present invention, based upon external data; one or more data storage means, such as random access or read-only memory chips, or hard drives, containing the present invention and zip code/latitude and extraterrestrial radiation lookup tables used herein, and storing the preliminary and adjusted irrigation schedules; a power source, either alternating-current (AC), direct-current (DC), battery or solar-powered; at least one temperature sensor, which may be a separate unit in communication with the microprocessor (e.g., through a physical hard-wired connection, a wireless connection or radio transmission) or a component built into the irrigation controller; and means for controlling or limiting the water used by an irrigation system, such as cutoff switches or adjustable valves.

One embodiment of the irrigation controller embodying the present invention is installed within a common polyvinyl-chloride (PVC) irrigation pipe. The pipe may be inserted into the ground so that it extends only slightly therefrom. This placement minimizes the profile of the controller, increasing the aesthetic appeal of the surrounding environment and reducing the likelihood of vandalism. The controller utilizes wireless communication means (such as radio or infrared), allowing the operator to program the apparatus remotely. A temperature sensor is installed within the pipe at a position that minimizes sun-loading effects. Such a location may be near or just below ground level, or on top of the pipe under a shaded and ventilated cover. An optional precipitation sensor, with or without a rain-catcher, may be mounted at the top end of the pipe to detect rainfall, or at another location in wired or wireless communication with the controller.

The preferred embodiment is battery-powered, using commercially available technology emphasizing energy conservation and the long-distance operation of irrigation valves. Significantly extended battery life, and the extended range of DC valve operations, allows the controller to be placed in remote areas, without the need for AC power or solar panels. Such battery power minimizes the dangers of power surges and outages, and improves electrical safety and aesthetic appeal. It also eliminates the installation and maintenance cost of power meters, and their unattractiveness in the landscaped area.

An alternative embodiment provides for the irrigation controller to be housed within a valve box, with externally mounted temperature and optional precipitation sensors affixed upon, or in wired or wireless communication with, the controller. The controller may be powered by using any one or more of the power sources described above, depending upon its particular placement relative to such available sources. This approach may be better suited for certain residential, commercial, and turf irrigation applications.

In use, the operator first attaches the irrigation controller to an existing irrigation system. This can be done at any time of the year, not merely during the summer months. He also installs the temperature sensor within the target geographical area, and initiates its communication with the controller. An optional readily available rain sensor may also be installed, and placed in communication with the controller.

The operator initially programs the controller as follows: he first enters the current time (e.g., month, day and/or year). He then enters the expected summer high (referred to herein as the "stored" or "standard") temperature at the particular controller location, the approximate or estimated date of such expected high temperature, and the latitudinal location of the controller. The latitudinal location may be determined by the operator from information provided by various sources, such as online databases or a reference chart in the controller owner's manual, or by the controller when the operator enters the local zip code. An exemplary initial setup screen would thus have an appearance similar to the following:

Current Time/Date: 10:15 AM Feb. 15, 2004
Expected Summer High Temperature: 98° F.
Date of Expected High Temperature: July
Latitude of this Location: 34° N The operator then enters the summer preliminary irrigation schedule. This preliminary schedule may be obtained from a system designer, consultant, equipment distributor or architect, any of whom would recommend the typical summer irrigation schedule based on the soil type, slope, variety of landscaping, types of valves and sprinklers, and water available for that particular area.

The controller then automatically determines the extraterrestrial radiation factor (RA) for the standard date and location from a look-up table stored within the controller. The RA utilized by this invention must be distinguished from the solar radiation value (Rn or Rs) provided by weather stations and sensors, and utilized by ETo formulas. Specifically, RA is a function of the angle at which the sun strikes the earth at various times of the year at various latitudes, while solar radiation is a measure of the actual intensity of sunlight at a particular time.

The controller then automatically calculates the standard temperature budget factor (STBF) using data provided by the operator (i.e., the summer high temperature, its date and the latitude) and any number of relatively simple formulas utilizing the RA value for the high temperature date. Specifically, and as described in greater detail herein, one method of calculating the STBF is to multiply the high summer temperature (provided by the operator) by an RA (the RA determined by the particular geographic location of the controller, and either the estimated date of the summer high temperature or the average summer RA values for the particular geographic location). The STBF is then stored within the controller and used for subsequent determinations of the water budget ratio (WBR), as described in greater detail herein.

The controller also obtains the actual high temperature and RA for the particular current period, the former from its temperature sensor and the latter from its internal look-up table. Such periodic data is used to calculate the periodic temperature budget factor (PTBF). The PTBF is calculated utilizing the same formula for calculating the STBF, but using currently available data rather than the data initially provided by the operator.

In one aspect of the invention, the controller then computes the WBR by dividing the PTBF by the STBF. This ratio is then used to adjust the preliminary irrigation schedule for that particular period. In this aspect of the invention, preliminary irrigation schedule is multiplied by the WBR to obtain the modified (actual) irrigation schedule. The present invention then irrigates the irrigation area pursuant to the modified irrigation schedule, as described in greater detail herein.

Because the present method relationally adjusts the irrigation schedule, it is suitable for nearly all conditions and locations. It inherently compensates for all of the characteristics and specifications of the existing irrigation system—unlike the prior art, it does not require multiple complicated formulas or variables. The method also inherently compensates for particular environmental conditions. For example, it may be applied to the "cycle and soak" method commonly utilized for sloped landscapes, since the present method increases or decreases the initial irrigation schedule for the sloped landscape based upon the WBR.

An alternative embodiment of an apparatus embodying the present invention provides a temperature budgeting module in place of a stand-alone irrigation controller. This module is placed along the output path of an existing irrigation controller, so that it intercepts and processes any signals from the controller to the irrigation system. This module performs the same tasks as the stand-alone irrigation controller, and permits the operator to add the desired features described herein to any existing irrigation controller without replacing the old controller entirely.

Another alternative embodiment of an apparatus embodying the present invention permits the operator to install the present invention upon an existing irrigation controller by making the appropriate software changes to the instruction set of the controller, and by adding a temperature sensor to an available input port.

An alternative embodiment of the present invention does not require the operator to input the actual date of the expected high temperature. Instead, the present invention may assume that such date occurs during the summer months, and average the RAs for the summer months to obtain an average RA for the STBF calculation.

Another alternative embodiment of the present invention allows the operator to input the temperature, date and preliminary irrigation schedule for any time of the year. The present invention then determines the STBF from such data. The WBR remains accurate due to the ratio relationship between the PTBF and STBF, as described herein.

Another alternative embodiment of the present invention utilizes AC power instead of battery power. While the latter is the preferred embodiment herein because it is the most challenging, residential applications constitute over half of all landscape irrigation controllers. Virtually all of these residential controllers are AC-powered. Such an alternative embodiment of the present invention may be installed anywhere upon the residential property, such as within a the garage. It may be operated by input means built into the controller, or by wireless transmission from a remote. The temperature and rain sensors are mounted outdoors to measure ambient temperature, at various locations (such as the eve of the garage). These sensors may be hardwired to the controller or in short-range wireless communication with the controller. The method of calculating the WBR, and the operation of the cutoff switches and valves, remain unchanged.

Optional procedures may also be incorporated into the present invention. For example, after entering the expected summer high temperature and latitude, the operator may specify the minimum irrigation temperature. This insures that the irrigation schedule is not activated when the temperature is near or below a certain point, such as freezing temperature. Such minimum temperature requirement serves two primary purposes—first, to conserve water, and second, to protect the safety of vehicles and pedestrians traveling through the irrigation zone during freezing temperatures. A second option permits the operator to further adjust the irrigation schedule according to the particular circumstances and/or limitations, such as the water delivery method utilized by the irrigation system, the specifications of the system, or the type of plants being watered. This allows the operator to fine-tune the irrigation schedule based upon personal experience, observations or unusual field situations. A third option is to attach a commonly available precipitation sensor to the irrigation controller, either directly or indirectly as a separate unit in communication with the irrigation controller (e.g., through a physical hard-wired connection, a wireless connection or radio transmission) or as a component built into the irrigation controller, so that the controller may detect the occurrence of rainfall and suppress the irrigation schedule during the affected periods. The particular effect of current or recent precipitation upon the irrigation schedule may be determined by the operator. For example, the operator may cause the present invention to suppress the irrigation schedule if precipitation occurred within the previous twenty-four hours, or only if precipitation is occurring at the particular moment of irrigation.

It is therefore a primary objective of the present invention to provide a simple method for irrigation water conservation, particularly one that is naturally intuitive such that it may be used by a wide variety of people or entities in different circumstances.

It is another primary objective of the present invention to provide a method for conserving water by automatically adjusting irrigation schedules in response to varying climatic conditions.

It is another primary objective of the present invention to provide a method that utilizes greatly simplified local, real-time meteorological data to calculate and maintain the irrigation schedule.

It is another objective of the present invention to provide a method that minimizes the margins and sources of error within the automatically and climatically adjusted irrigation schedules by limiting the number of variables and relationships necessary to calculate and maintain the schedules.

It is another objective of the present invention to provide a method that may be embodied into any irrigation controller that is inexpensive to manufacture, install, operate and maintain.

Additional objects of the present invention shall be apparent from the detailed description and claims herein.

BRIEF DESCRIPTION OF THE DRAWINGS

FIG. 6 is a table of extra terrestrial radiation values at various latitudes.

DETAILED DESCRIPTION

Figure 1:
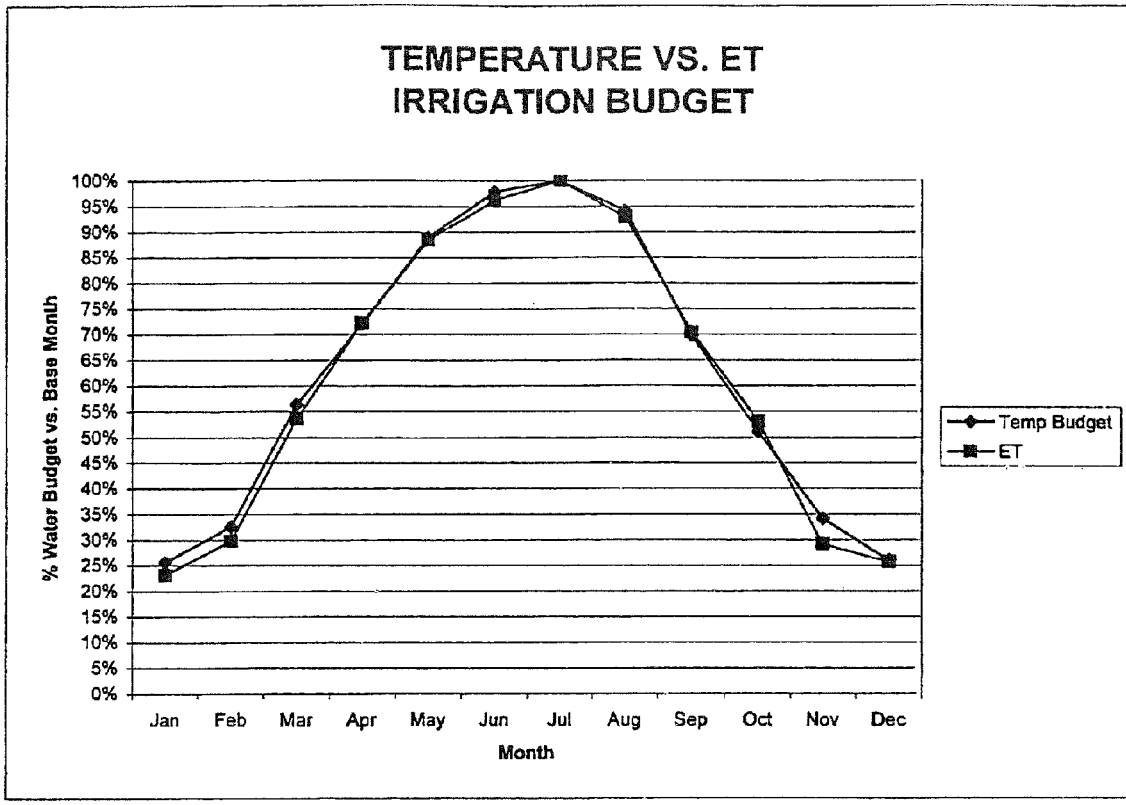
FIG. 1 is a comparison of evapotranspiration and temperature budget values for certain geographical areas of California over a five year period, beginning in 1997.

FIG. 1 compares the monthly ET values obtained using the Penman-Monteith formula (currently favored by the USFAO and CIMIS) with the ratios obtained utilizing the formula of the preferred embodiment described herein. Such comparison was made over a period of five years at twenty-five environmentally-diverse locations within the State of California. Both formulas used the same CIMIS data. For the Penman-Monteith formula, the published historical monthly ETo was divided by the historical summer ETo. The monthly temperature budget factors obtained by the present invention were similarly divided by the summer temperature factor. The ETo ratio is then compared to the WBR for relative accuracy. As indicated by FIG. 1, the values obtained using the formula herein closely approximate the Penman-Monteith, generally more so than the other ET formulas. This indicates that the present invention is superior to the other ET formulas, since a simple to understand method that is ninety-five percent as accurate as the current accepted 'standard' will save much more water than a more complicated method that is less accurate, and not as easily understood or utilized.

Furthermore, the present invention is advantageous over the Penman-Monteith, or any other ET, formula in that it reaches similar irrigation time values without relying upon the numerous variables and relationships of the ET theory, or a subsequent calculation of irrigation time settings. Instead, the present invention utilizes only two variables—ambient temperature and the extraterrestrial radiation factor. Given this relative simplicity, and its intuitive approach, the present invention is much more likely to be adopted by the general public.

Another advantage of the present invention over the Penman-Monteith formula, or any other ET formula, is in terms of hardware costs. Specifically, in one alternative embodiment, only a temperature sensor is required—the existing irrigation controller, assuming that it satisfies certain minimum system requirements (such as the availability of an input port for the temperature sensor, sufficient memory to store the RA lookup table, and the ability to receive the software instructions for the present invention), may be used. This controller may be AC, DC, solar, or battery-powered.

Figure 2:
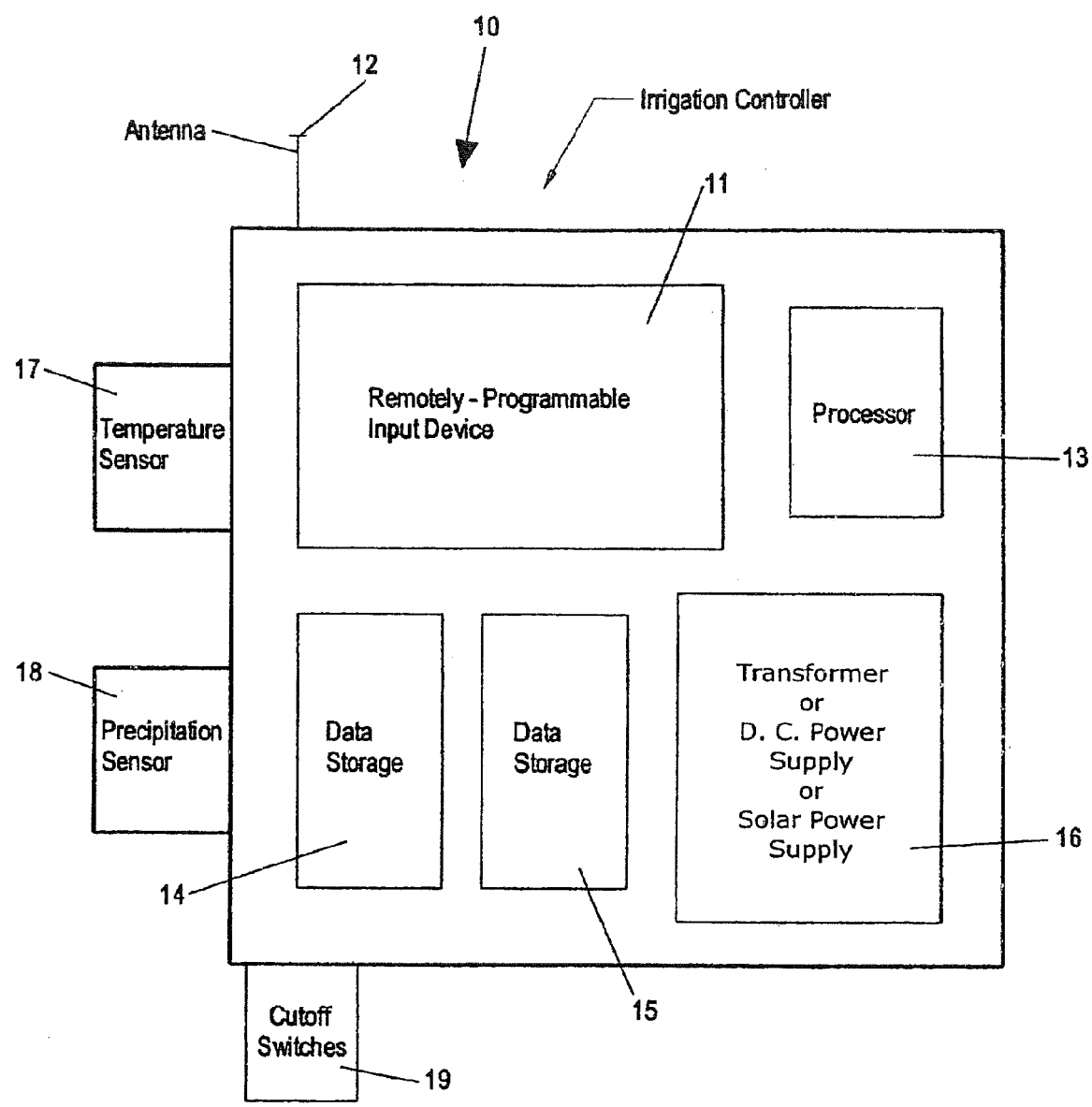
FIG. 2 is a block diagram of an irrigation controller embodying the present invention.

FIG. 2 depicts an irrigation controller 10 embodying the present invention. Such controller comprises the following components: a remotely-programmable input device 11 for entering data into the controller; an optional antenna 12 for receiving data from the operator via wireless means; a microprocessor 13; a first data storage means 14, such as a hard drive, containing a zip code/latitude lookup table formatted in a conventional mariner, an extraterrestrial radiation lookup table formatted in a conventional manner, and the formula of the present invention, all for computing and adjusting the irrigation schedule based upon the data received; a second data storage means 15, such as a hard drive, for storing and maintaining the irrigation schedule information and data received by the controller; a battery, solar panel, or AC power supply, such as a transformer, 16; a temperature sensor 17 built into the irrigation controller; an optional precipitation sensor 18, also built into the irrigation controller; and a cutoff switch 19 for controlling water output from the irrigation system.

Figure 3:
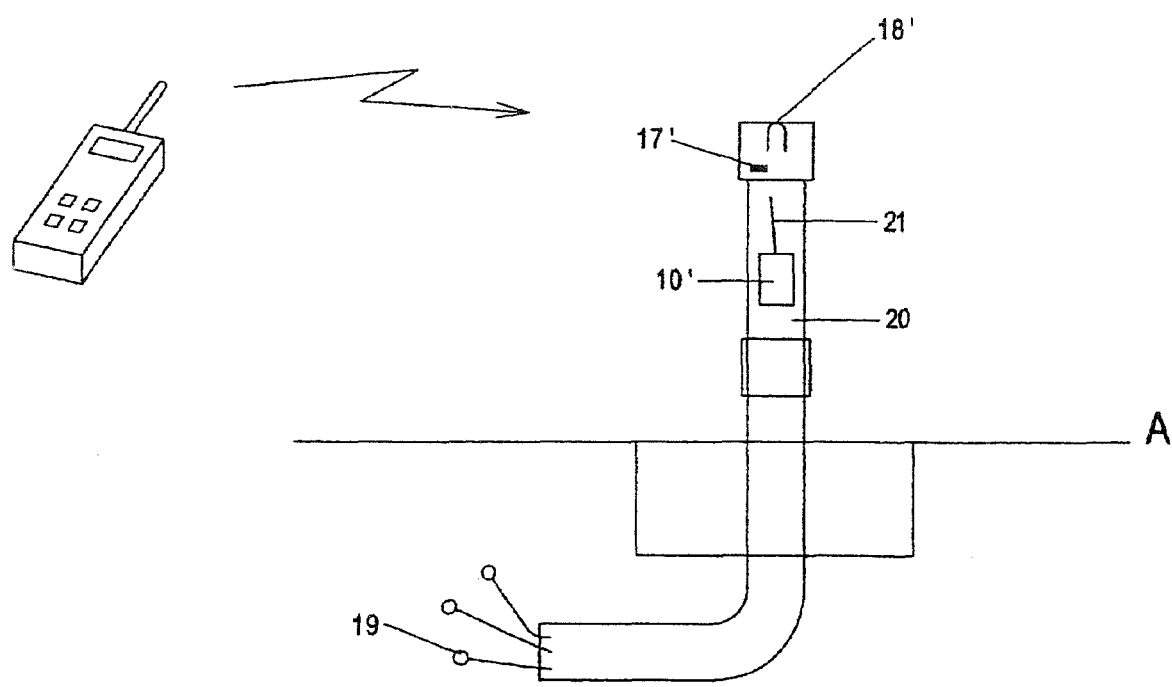
FIG. 3 is an environmental view of an alternative housing for the irrigation controller embodying the present invention.

FIG. 3 depicts an alternative housing for the irrigation controller 10' of the present invention. Here, it can be seen that the main body of the irrigation controller 10' (comprising the remotely-programmable input device 11, antenna 12, microprocessor 13, first 14 and second 15 data storage devices, and battery 16, none of which are depicted in this particular figure) is placed above ground level A. The temperature sensor 17' and optional precipitation sensor 18' may be incorporated with controller 10' and mounted, for example on top of the pipe as shown. Instead, these sensors are mounted above ground level A, and in communication with the irrigation controller 10' by wired means. The controller housing 20 (which may be a common PVC pipe) encloses and protects the controller 10 from the environment. The wires from the controller 10 to the cutoff switches (valves) 19 extend out of the housing 20 to the valves located in the field. It is to be understood that communications between sensors 17', 18' and the controller 10' may also be accomplished using wireless means by adding an antenna 21 to the sensors 17', 18' and the controller body 10', and placing the sensors in wireless communication with the irrigation controller 10'.

Figure 4:
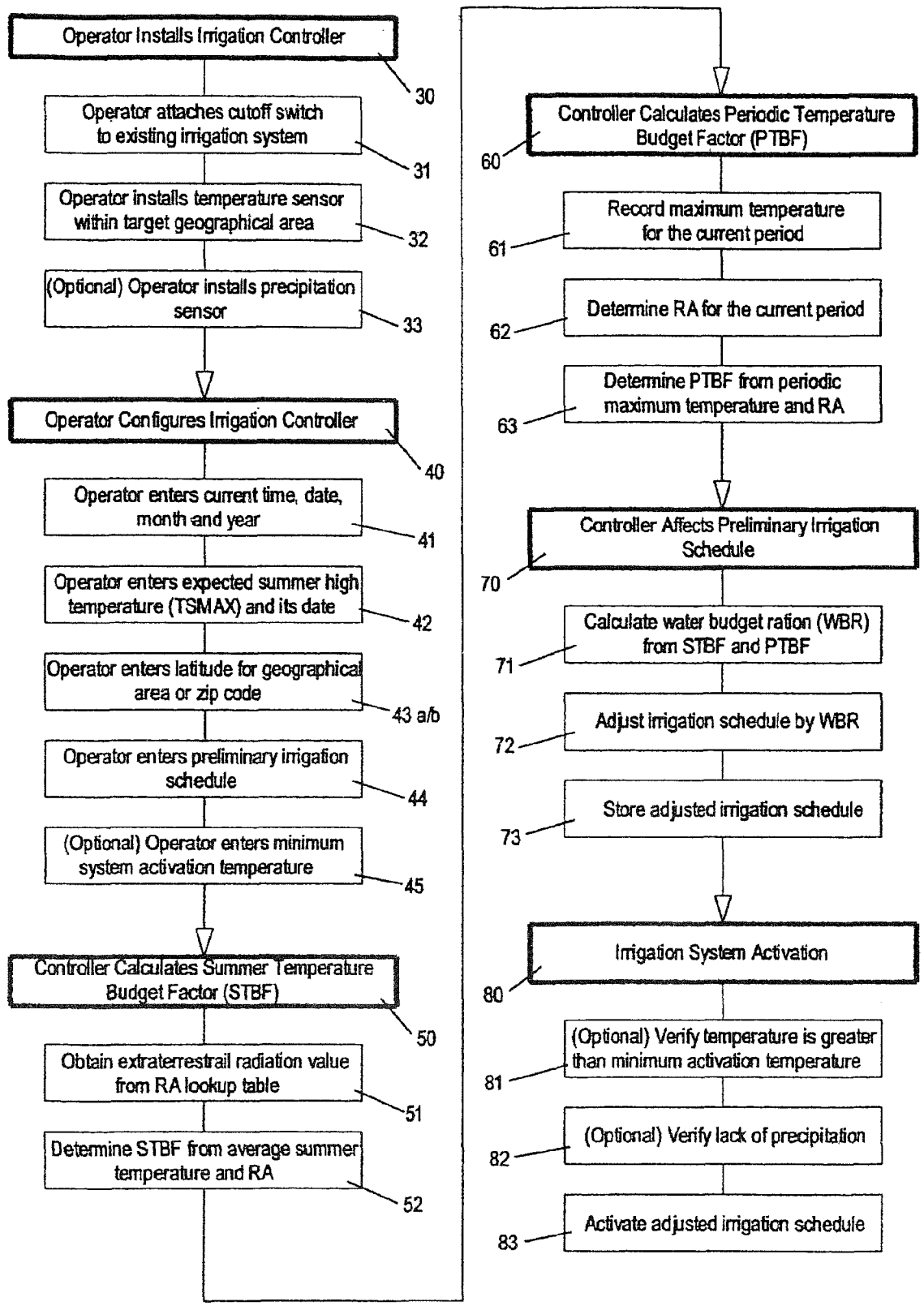
FIG. 4 is an exemplary flowchart depicting the complete and comprehensive steps of the present invention, including those steps performed manually by the operator.

As indicated in FIG. 4, a method of the present invention comprises the following steps: first, the operator installs the irrigation controller 10 (step 30) by attaching one or more cutoff switches 19 to an existing irrigation system (step 31) and installing temperature sensor 17 within the target geographical area (step 32). The optional precipitation sensor 18 may also be installed within the target geographical area (step 33). The two sensors are then placed in communication with the irrigation controller.

The operator then configures the irrigation controller (step 40). This is done by entering the current time (e.g., month, and/or day and/or year) (step 41). The operator also enters the expected maximum summer temperature ($T_{AMAX}$) and may enter the date of such temperature (step 42). The operator then provides the latitude for the geographical area (step 43a), if known. If the latitude is unknown, the operator may instead enter the zip code (step 43b) or some other geographical information (e.g., city, county, state, country, etc.) which the microprocessor 13 may use to obtain the latitude for the location from an appropriate lookup table within the first data storage means 14. The operator also enters a preliminary (summer) irrigation schedule having one or more run times (step 44). The operator may also enter the minimum system activation temperature (step 45). All of this information may be stored within the second data storage means 15.

The microprocessor 13 then calculates the standard temperature budget factor (STBF) using the $T_{SMAX}$ and extraterrestrial radiation (RAs) (step 50). The RAs value is obtained from the extraterrestrial radiation lookup table within the first data storage means 14 (step 51), based upon the latitude of the location and the estimated date of the expected maximum temperature. If the operator did not provide a particular date for the expected maximum summer temperature, an embodiment of the present invention will generate a RAs value by averaging the RA values for the summer months (which may be November-January in the Southern Hemisphere). The STBF is then determined using the following formula: (step 52)

$$STBF = T_{SMAX} \times RAs$$

Using a summer RA factor is preferred because it is relatively constant throughout the summer months (June, July, and August, in the northern hemisphere), and those are the months that would typically require the highest amounts of irrigation. However, it is to be understood that the present invention is not limited solely to those particular RA values, and that the RA for any month may be used. In particular, other embodiments of the invention may allow for use of an average high temperature over a period of time (e.g., annual, bi-annual, quarterly, monthly, weekly, etc.) from which a corresponding RAs value is determined and used in the formula.

Another embodiment of the present invention would permit the operator to input a preliminary irrigation schedule and temperature for any time of the year, followed by the particular date such information is applicable. The date is then used by the controller 10 to determine the applicable RA. Such value is likewise accurate when used with the ratio method of the present invention.

As the formula demonstrates, the maximum (standard) temperature ($T_{SMAX}$) and extraterrestrial radiation (RAs) are the only factors required by the present invention to determine STBF. The $T_{SMAX}$ directly affects the plants' water requirements. The RAs is important because evaporation is also affected by the angle at which the rays of the sun strike the Earth; such angles vary depending upon the latitude and the time of year.

The controller of the present invention then calculates the periodic temperature budget factor (PTBF) (step 60). Using temperature sensor 17, the controller 10 records the maximum temperature ($T_{PMAX}$) for a particular predefined period (step 61). These temperatures are recorded by temperature sensor 17 on a periodic basis (e.g., hourly, daily, etc.), and stored within the second data storage device 15 until the end of the period. At the end of the predefined period, the microprocessor 13 calculates the PTBF using the maximum temperature ($T_{PMAX}$) for the period, and the current/present extraterrestrial radiation ($RA_P$) for the same period. The $RA_P$ factor can be obtained or extrapolated from the chart (based upon the particular day, week, or month, as provided by the time-keeping function of the CPU) (step 62). For subsequent period, the recorded high temperature for the previous period is replaced with the latest measured high temperature. If this is done on a daily basis, the previous high temperature is replaced with highest temperature recorded during the past 24 hours. To conserve controller memory, the $RA_P$ chart could be stored monthly in increments of two degrees of latitude, as depicted in FIG. 6. The microprocessor 13 could then determine the PTBF, as follows: (step 63)

$$PTBF = T_{PMAX} \times RA_P$$

Once the PTBF is calculated, the microprocessor 13 may then affect the preliminary irrigation schedule (step 70), specifically by calculating the water budget ratio (WBR) as follows (step 71):

$$WBR = \frac{PTBF}{STBF}$$

A WBR value of one (1) indicates that the periodic TBF equals the summer TBF, in other words, that the irrigation needs for that particular period are satisfied by the initial summer-based irrigation schedule. Thus, no automated changes to the initial irrigation schedule would be needed for that particular period. A WBR value of greater than one would indicate that the PTBF was higher than the STBF, such that the irrigation needs for that particular period are greater than the irrigation needs for an average summer day. This would cause the controller to increase the irrigation schedule for the following period by a corresponding amount. A WBR value less than 1, which would be the case most of the time that is not during the summer, indicates that less irrigation is needed than the average summer day, causing a decrease in the irrigation schedule for the following period.

The microprocessor 13 then multiplies the preliminary irrigation schedule by the WBR value (step 72). This causes the irrigation schedule adjustment to be determined by the ratio of the two temperature and RA values, ensuring that the area does not receive too little or too much water. The adjusted irrigation schedule is then stored upon the second data storage device 15, to be utilized for the following period (step 73).

When the irrigation schedule calls for water (step 80), the irrigation controller 10 first verifies the temperature (step 81), using temperature sensor 17, and if provided, the precipitation, using optional precipitation sensor 18 (step 82). If the current temperature is greater than the previously specified minimum system activation temperature, and there is no recent or current precipitation (as previously defined by the operator), the controller 10 activates (step 83) the irrigation system according to the adjusted schedule. If either of those conditions fails, the irrigation system is not activated. This prevents activation of the irrigation system on very cold or rainy days. Whether or not the irrigation system is activated, the controller 10 also continues recording (step 61) the $T_{PMAX}$ values for subsequent PTBF calculation and schedule modification.

This method for adjusting the irrigation schedule may be used year-round, and at any geographic location. For example, the winter PTBF will typically be much lower than the STBF, resulting in a much lower WBR value. This in turn significantly decreases the irrigation duration, which is consistent with the average consumer's understanding that irrigation is not as necessary during the winter months. When the operator inputs a minimum temperature and utilizes the precipitation sensor, the present invention is able to completely cease irrigation during unnecessary periods.

Figure 5:
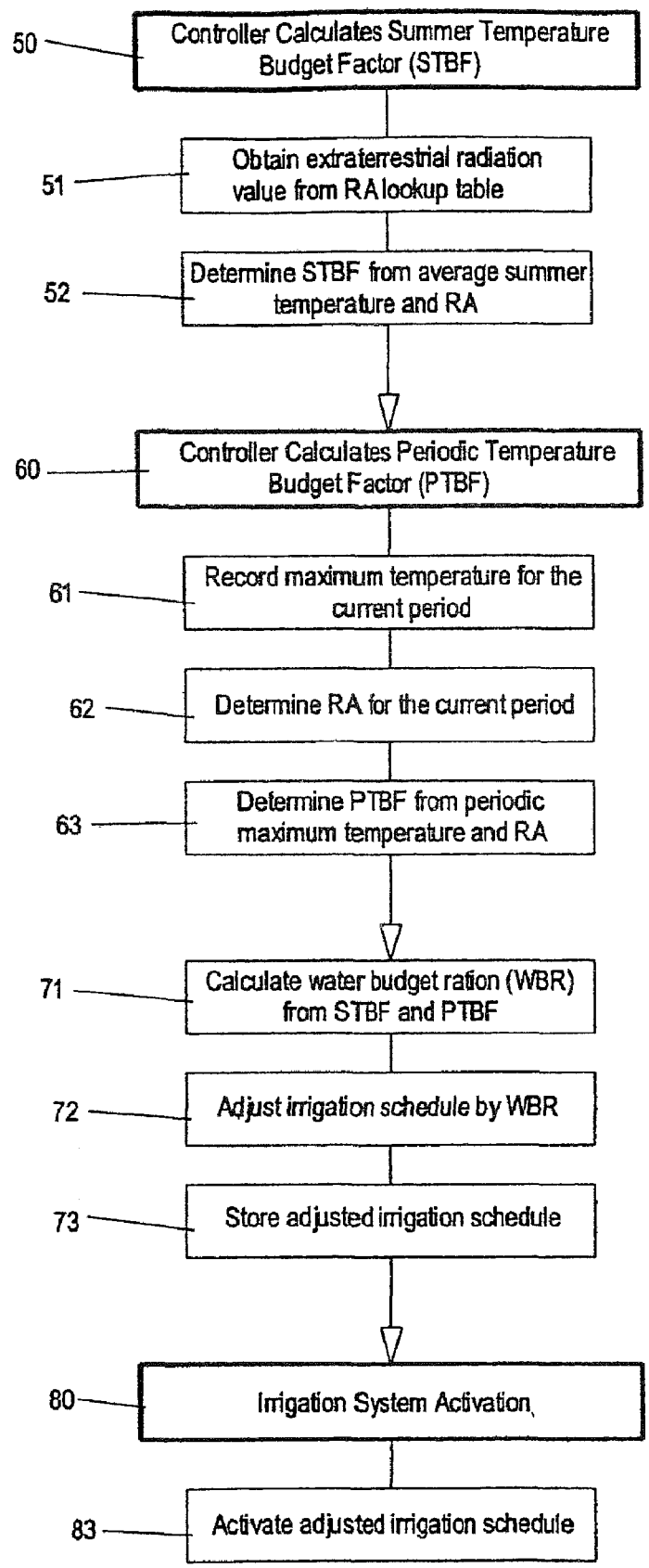
FIG. 5 is an exemplary flowchart depicting the basic steps of the present invention, particularly only those steps performed automatically by the controller embodying the present invention.

FIG. 5 depicts the portion of the method of the present invention performed by the controller itself. From this depiction, it is apparent that the present invention is able to automatically calculate and adjust the irrigation schedule in a simple manner, without resorting to the numerous and complex data and calculations found in the various ETo methods.

FIG. 6 is a published table of extra terrestrial radiation values at various latitudes. As indicated herein, this table is stored within the first data storage device 14 of an apparatus embodying the present invention.

EXAMPLE OF THE PRESENT INVENTION IN PRACTICE

The following example is provided for illustrative purposes only and without limiting the appended claims. This example assumes that the operator has already determined the preliminary irrigation schedule using any number of commonly available methods, such as personal experience, or from the system designer.

Assume for the purpose of this example that an irrigation controller embodying the present invention is to be installed in Fresno, Calif., at 10:15 a.m. on Feb. 15, 2004. The operator installs the controller and enters the current time, date, month and year. He then enters the expected summer high temperature in Fresno as 98° F. in July, and the latitude (available from the owner's manual, or by entering the local zip code) as 37° N. The temperature budgeting setup screen would then appear as follows:

Current Time/Date: 10:15 AM Feb. 15, 2004
Expected Summer High Temperature: 98° F.
Date of Expected High Temperature: July
Latitude of this Location: 37° N The controller immediately determines from its internal look-up table that the average summer RA factor at this particular latitude is 16.7. The controller then calculates the STBF for summer in Fresno to be 1636.6 (the temperature of 98° F., multiplied by average Fresno summer RA of 16.7). Finally, he enters an irrigation schedule for his first irrigation station, which for this example is six (6) minutes of watering time three times a day.

Assume that the date is now November 2. The recorded high temperature for the previous period (twenty-four hours herein) was 52° F. The controller lookup table indicates that the Fresno RA on this particular day is 7.7. This means that the PTBF is 400 (the temperature of 52° F., multiplied by the RA of 7.7). Dividing the PTBF by the STBF provides a WBR value of approximately 0.244. The irrigation duration for this particular period will be decreased to approximately 1.5 minutes of water (the 6 minute initial irrigation schedule, multiplied by the WBR value of 0.244=1.46 minutes of water), thrice per day.

The operator could also program the controller to suspend irrigation if the temperature at the beginning of an irrigation cycle is below the specified minimum temperature, or (if a precipitation sensor is included) if precipitation exists during, or before, an irrigation cycle. For example, assume that precipitation exists during the second watering irrigation time above. The precipitation sensor detects the existence of such precipitation, and communicates such existence to the controller, causing the controller to cancel the previously scheduled second watering duration of 1.5 minutes. Further assume that the minimum temperature is set at 35° F. Further assume that, at the beginning of the third irrigation time above, the current temperature was 34° F. This would cause the controller to cancel the previously scheduled third watering duration of 1.5 minutes.

This simple, intuitive, cost-effective, user-friendly approach encourages significantly higher long-term consumer participation, making it possible to save most of the wasted landscape water and subsequent runoff, which in California would be over one million acre feet. The additional infrastructure and environmental benefits of this water conservation have previously been enumerated by the EPA, as described herein.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

What is claimed is:

1. An apparatus for determining a water budget percentage for use with an irrigation controller comprising:
   a. a microprocessor containing historical local geo-environmental data and having instructions for determining a water budget percentage by comparing current environmental data to said historical local geo-environmental data without calculating evapotranspiration; and
   b. at least one environmental sensor in communication with said microprocessor for providing said current environmental data.

2. The apparatus of claim 1 wherein said microprocessor is provided in a controller, and said controller has programming to automatically adjust an irrigation watering schedule using said percentage.

3. The apparatus of claim 2 wherein said irrigation watering schedule comprises at least one station run time.

4. The apparatus of claim 1 wherein said microprocessor is provided in a separate module that is plugged into said an irrigation controller through an available input port.

5. The apparatus of claim 1 wherein said microprocessor is provided in a separate module that is placed on at least one output line between an said irrigation controller and at least one valve.

6. The apparatus of claim 1 wherein said at least one environmental sensor is selected from the group of: ambient temperature, soil temperature, soil moisture, solar radiation, wind, relative humidity, precipitation and combinations thereof.

7. The apparatus of claim 1 wherein the communication between said microprocessor and said at least one environmental sensor is by one of wired or wireless communication.

8. A method for modifying an irrigation schedule of a controller comprising the steps of:
   a. providing said controller with a preliminary irrigation schedule;
   b. automatically producing a water budget percentage without calculating evapotranspiration, and
   c. automatically modifying said preliminary irrigation schedule of said controller using said percentage.

9. The method of claim 8 wherein said water budget percentage is produced in a controller microprocessor.

10. The method of claim 8 wherein said water budget percentage is produced in a microprocessor located in a separate module.

11. The method of claim 10 comprising the additional steps of
   a. plugging said separate module into said controller and
   b. said separate module communicating said water budget percentage to said controller.

12. The method of claim 11 wherein said module is plugged into an available input port on said controller and communicates with said controller through said port.

13. The method of claim 8 wherein said step of modifying said preliminary irrigation schedule comprises changing at least one station run time according to said water budget percentage.

14. The method of claim 8 wherein said step of producing a water budget percentage comprises comparing current environmental data for a location with historical geo-environmental data for the location.

15. The method of claim 14 wherein said current environmental data is received from at least one environmental sensor.

16. The method of claim 8 comprising the additional steps of providing at least one irrigation shut down sensor, and preventing watering according to input from said at least one shut down sensor.

* * * * *